D. D. BOHANNON 1,489,656

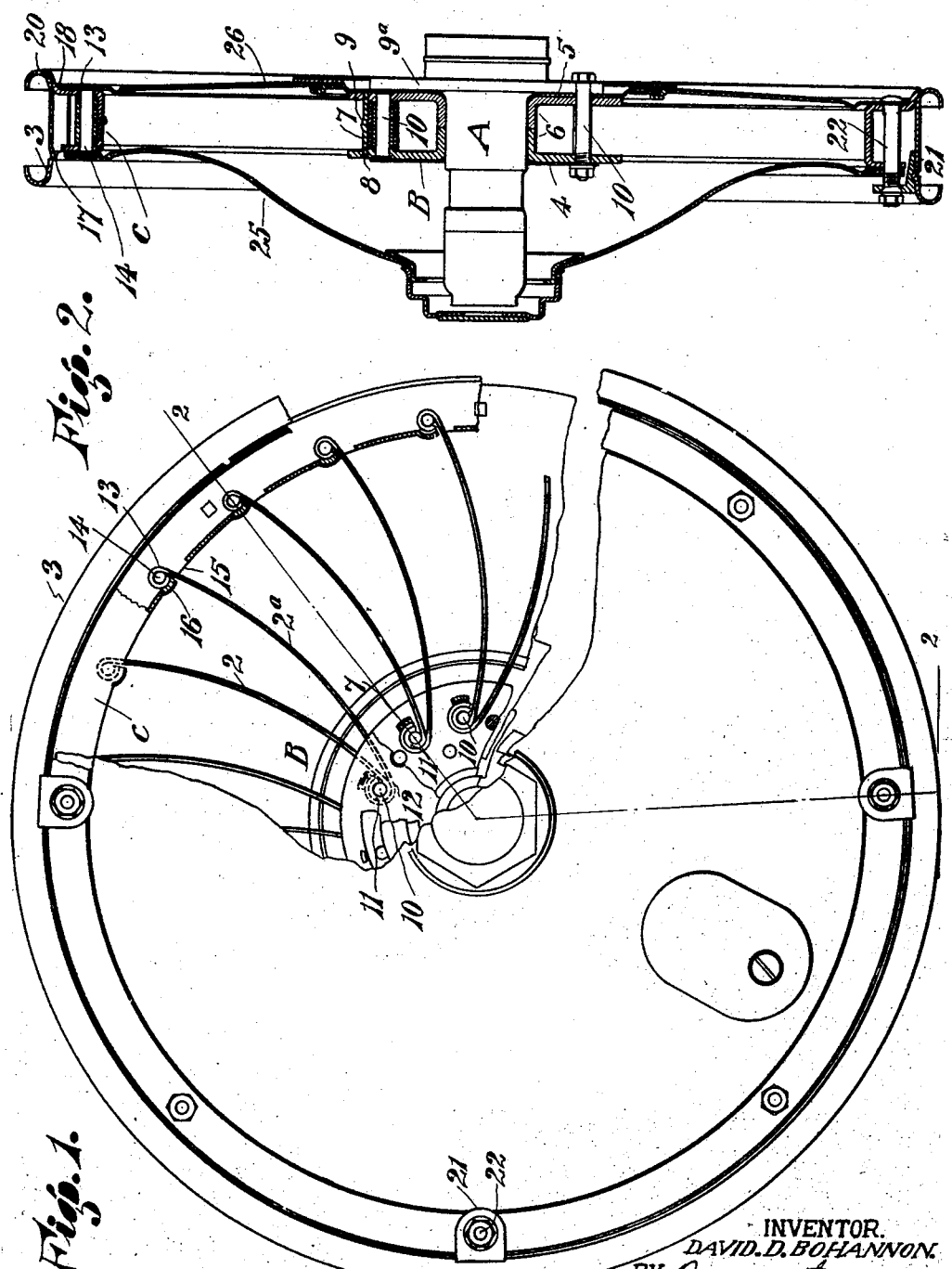
April 8, 1924.
D. D. BOHANNON
1,489,656
HUB AND FELLY STRUCTURE FOR RESILIENT WHEELS
Filed April 16, 1923
3 Sheets-Sheet 1
INVENTOR.
DAVID. D. BOHANNON.
BY
ATTORNEYS April 8, 1924.

HUB AND FELLY STRUCTURE FOR RESILIENT WHEELS

Filed April 16, 1923

INVENTOR
DAVID D. BOHANNON.

BY
ATTORNEYS.

April 8, 1924.
D. D. BOHANNON
1,489,656
HUB AND FELLY STRUCTURE FOR RESILIENT WHEELS
Filed April 16, 1923   3 Sheets-Sheet 3
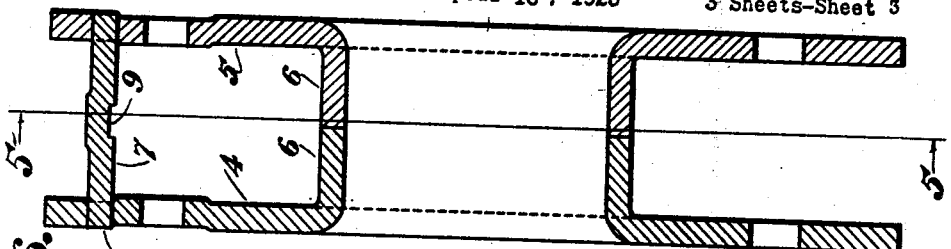
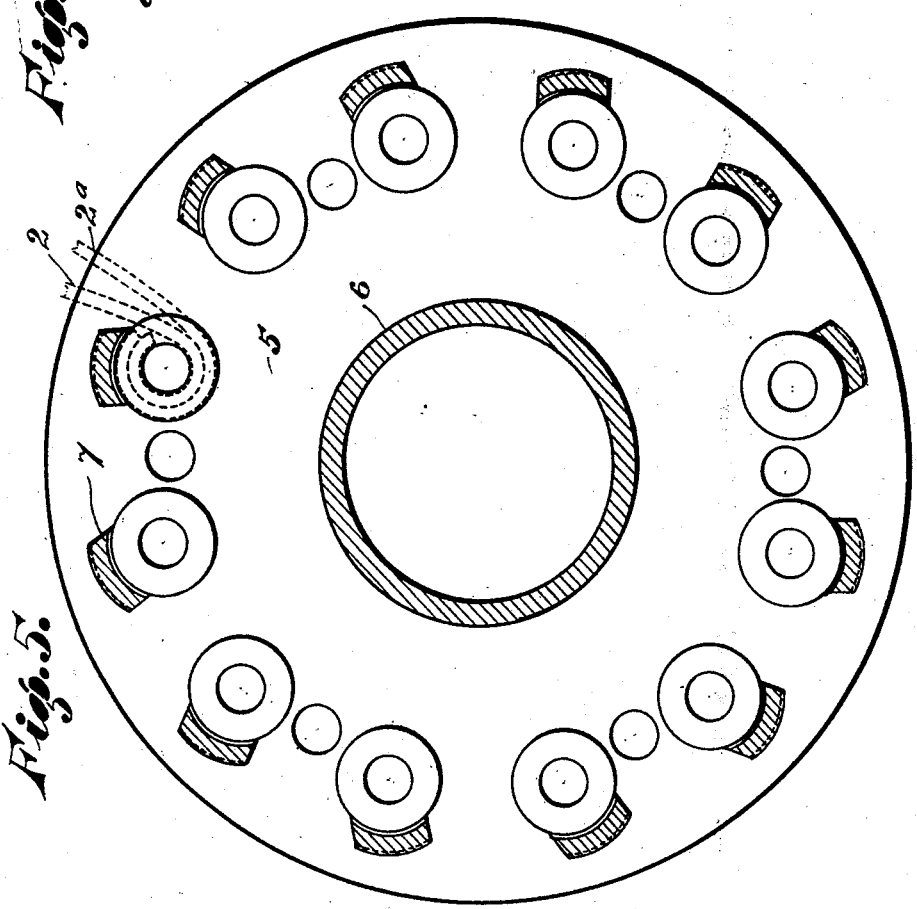
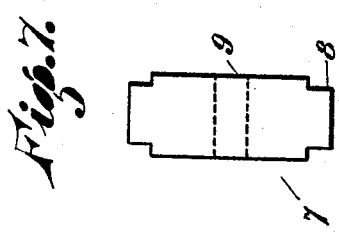
INVENTOR
DAVID D. BOHANNON.
BY
ATTORNEYS.

Patented Apr. 8, 1924.

1,489,656

UNITED STATES PATENT OFFICE.

DAVID D. BOHANNON, OF OAKLAND, CALIFORNIA, ASSIGNOR TO RESILIENT SAFE-WHEEL COMPANY, OF OAKLAND, CALIFORNIA, A CORPORATION OF CALIFORNIA.

HUB AND FELLY STRUCTURE FOR RESILIENT WHEELS.

Application filed April 16, 1923. Serial No. 632,361.

*To all whom it may concern:*

Be it known that I, DAVID D. BOHANNON, a citizen of the United States, residing at Oakland, county of Alameda, and State of California, have invented new and useful Improvements in Hub and Felly Structures for Resilient Wheels, of which the following is a specification.

This invention relates to resilient wheels and especially to a hub and felly structure therefor.

The object of the present invention is to generally improve and simplify the hub and felly structure of resilient wheels, and especially that type employing spring spokes, and further, to embody in the hub and felly a structure which provides ample bearing areas for the opposite ends of the spring spokes and which also permits ready insertion and removal of the spokes for inspection, repairs, or otherwise.

One form which my invention may assume is exemplified in the following description and illustrated in the accompanying drawings, in which—

Fig. 1 is a side elevation of a resilient wheel employing spring spokes, said view showing the hub and felly structure partly in side elevation and partly in section.

Fig. 2 is a cross-section on line 2—2, Fig. 1.

Fig. 5 is a side elevation in section taken on line 5—5, Fig. 6.

Fig. 6 is a cross-section of the hub structure.

Fig. 7 is a plan view of one of the hub spacing members.

Figure 3:
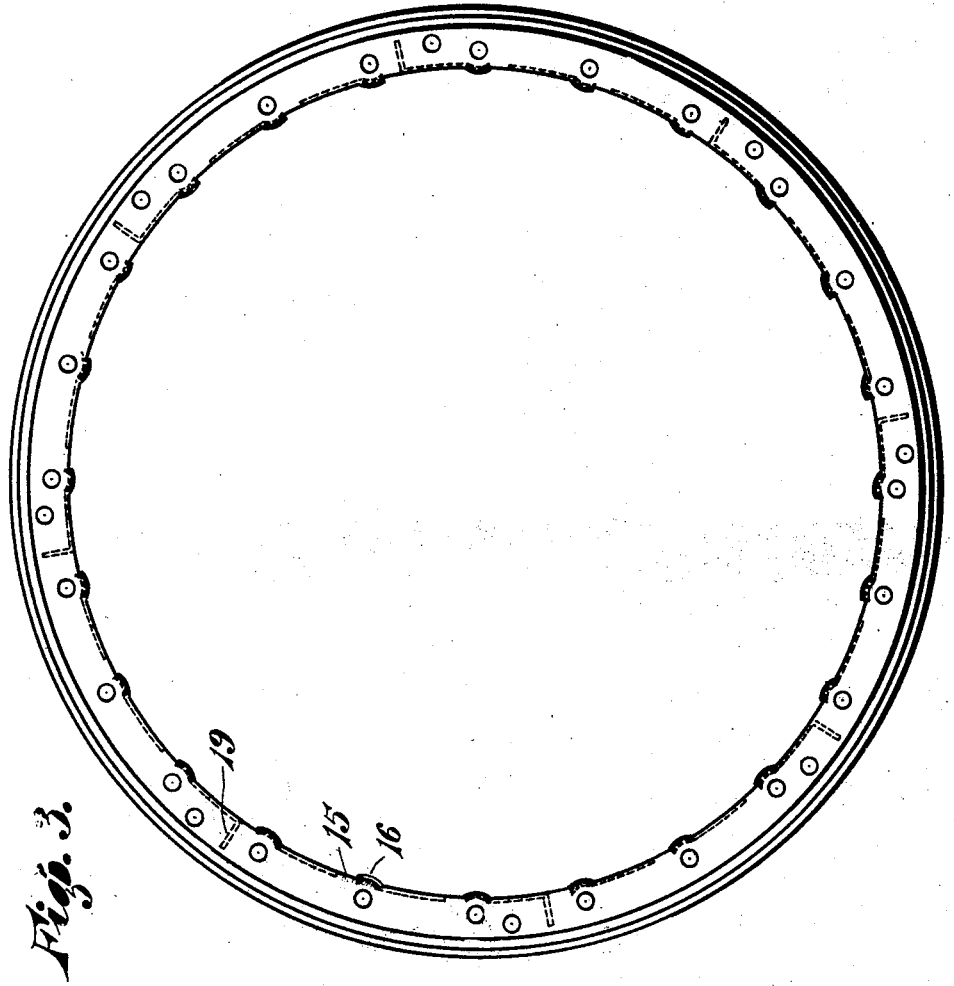
Fig. 3 is a side elevation of the felly.

Referring to the drawings in detail, and particularly to Figs. 1 and 2, A indicates the hub of a front wheel such as used on Ford automobiles, B the hub forming the subject-matter of the present application, C the felly, 2 the spring spokes interposed between the hub B and the felly C, and 3 a demountable rim, hereinafter to be referred to. The hub proper is perhaps best illustrated in Figs. 5 and 6. The hub is constructed of two separable sections as indicated at 4 and 5. These sections are preferably constructed of pressed steel and each section is provided with a hub portion 6, which forms a spacing member between the same. They are furthermore maintained in spaced relation by means of spacing members such as indicated at 7, the number of spacing members employed being equivalent to one-half the number of spokes employed. The spacing members are perhaps best illustrated in Figs. 6 and 7. They are formed from flat pieces of pressed steel and are curved in cross-section to form a support for the lower spring spoke eye, as will hereinafter be described. The ends are reduced, as indicated at 8, and the center portion of each spacer is grooved, as indicated at 9, to form a receptacle for grease or any other suitable lubricant. The hub members are perforated to receive the reduced ends 8 of the spacing members 7 and these reduced ends are either clinched, welded, or otherwise secured. The hub B, in other words, consists of two sections of pressed steel which form the hub 6 and side flanges 4 and 5, said side flanges being spaced apart by the hub section 6 and the spacing members 7. The separable sections of the hub are permanently secured and tied with relation to each other when the reduced ends of the spacing members 7 are clinched or otherwise secured.

The hub B is received by the standard hub A, being pressed over the same or otherwise fitted. The hub A is provided with a flange 9 and the hub B is permanently secured thereto when in place by means of bolts 10. (See Fig. 2.)

The spring spokes 2 (see Fig. 1) are arranged in pairs, the lower ends of each pair being pivotally connected with a common pin as indicated at 10. This pin is secured between the flanges 4 and 5 of the hub B, as illustrated in Fig. 2, and the spring eyes are allowed a certain amount of turning movement about the pin. Again, it is obvious that the spring eyes may be rigidly secured to the pin and that the pin may turn between the flanges 4 and 5 if desired.

Figure 4:
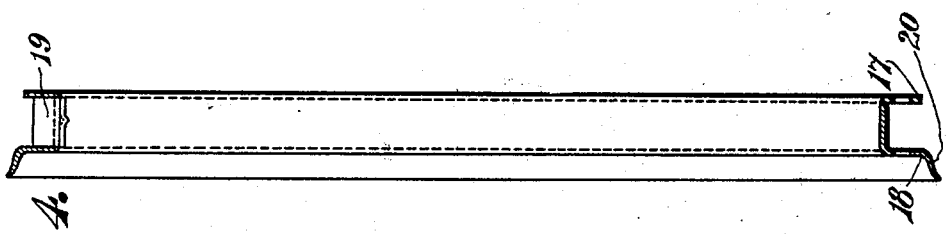
Fig. 4 is a cross-section of the same.

As previously stated, the spring spokes are arranged in pairs and the lower ends are connected to a common pin 10. One spring spoke of each pair, as indicated at 2, terminates in an eye 11 which surrounds the pin 10, while the second spoke of a pair, indicated at $2^a$, terminates in an eye 12 which surrounds the eye of the spring spoke 2. The position of the spacing members 7 is such that they engage the outer surface of the eyes 12 and as such form a bearing member or partial support therefor, and, to this extent, relieving the load on the pins 10. The outer ends of the spring spokes also terminate in eyes, as indicated at 13, and these eyes surround pins 14 secured in the felly C. The felly is annular in construction and channelled-shaped, as shown in Figs. 3 and 4, and is constructed of rolled steel. The bottom portion or inner surface of the felly is stamped or perforated at spaced intervals, as indicated at 15, to permit insertion of the spring spokes and to permit a certain amount of play. The bottom portion of the felly is also pressed or rounded in alignment with each pin 14, as at 16, to form a seat for the respective spring eyes 13, thus increasing the bearing area and, to this extent, relieving the pins 14 of a proportional amount of load strain, wear, etc.

The sides of the felly indicated at 17 and 18 are perforated to receive the pins 14, which may turn therein or they may be permanently secured as desired; that is, the eyes 13 of the spring spokes may be permanently fastened to the pins and the pins permitted to turn in the side flanges of the hub, or the pins may be riveted or otherwise secured between the side flanges and the eyes permitted to swivel about the pins. A permanent spacing is maintained between the side flanges 17 and 18 of the felly by transverse webs 19. These webs are arranged at regular intervals, as shown in Fig. 3, and they are formed by punching the bottom portion of the felly and turning the punched portion upwardly and outwardly as illustrated. The members 19 therefore maintain a permanent spacing between the side flanges and the hub, and furthermore reinforce and strengthen the same.

Any suitable type of demountable rim may be employed, but a four-lug rim is in this instance illustrated; that is, the rim is supported at two points, first by the periphery of the flange 17, and secondly by an annular seat 20 formed on the flange 18. The flange 18 limits the movement of the demountable rim in one direction, and movement in the opposite direction is limited by lugs 21 (see Fig. 2) and securing bolts 22. The demountable rim forms no part of the present application and it is, therefore, only briefly referred to; that is, it should be obvious that the felly may be shaped to receive any suitable type of rim.

By referring to Figs. 1 and 2, it will be noted that enclosing disks, such as illustrated at 25 and 26, are employed. These disks serve the function of enclosing the spring spokes and the pins about which they swivel. The disks, therefore, serve the function of excluding dust, grit, etc., and of retaining any lubricant employed. They also serve the function of generally improving the artistic appearance and design of the wheel. The specific structure of the enclosing disks, the method of applying and securing the same, etc., will not be described in detail in the present application as it forms the subject-matter of a separate co-pending application filed by me on March 19, 1923, Serial No. 626,060, entitled Disk wheel.

From the foregoing description submitted, it can be seen that an exceedingly simple and rigid hub and felly structure has been provided, which may be attached to practically any standard form of wheel hub; that the spring spokes employed may be readily inserted or removed for inspection, repairs, etc.; that means are employed for relieving the bearing pins of excess strain, as added bearing area has been provided by the spacing members 7 and the bent portions of the felly indicated at 16; the members 16 and 7 being grooved to receive and retain an additional quantity of lubricant. It can further be seen that an ideal resilient action may be obtained between the felly and the hub due to the method of securing or attaching the spring spokes as these are permitted to freely swivel when the wheel is in operation. It can furthermore be seen that the spacing members 7 and the bent portions 16 also form stops which limit excess swivelling movement. Again, by referring to Fig. 2, it will be noted that the width of the spring spokes 2 is such that practically no side play is provided, this being of great importance as it materially increases the lateral strength of the wheel, and furthermore avoids rattling and wear.

A wheel constructed as here illustrated usually employs a solid rubber tire, but in some instances pneumatic tires are used. In that instance, it would only be necessary to perforate the bottom portion of the felly to permit the valve stem to pass therethrough, this being accomplished without changing the structure in any manner as the perforation can be formed at any point desired between the spring spokes.

While certain features of the present invention are more or less specifically illustrated, I wish it understood that various changes in form and proportion may be resorted to within the scope of the appended claims; similarly, that the materials and finish of the several parts employed may be such as the experience and judgment of the manufacturer may dictate or various uses may demand.

Having thus described my invention, what I claim and desire to secure by Letters Patent is—

1. In a resilient wheel of the character described, a felly channel-shaped in cross-section to form a bottom portion and a pair of interspaced flanged portions, a plurality of interspaced openings formed in the bottom portion of the channel, a plurality of bearing pins disposed between the side flanges of the channel, one adjacent each opening, and a plurality of lateral reinforcing members bent up from the bottom portion of the channel and disposed between the side flanges.

2. In a resilient wheel of the character described, a felly channel-shaped in cross-section to form a bottom portion and a pair of interspaced flanged portions, a plurality of interspaced openings formed in the bottom portion of the channel, a plurality of bearing pins disposed between the side flanges of the channel, one adjacent each opening, and a plurality of cooperating bearing members carried by the felly, one for each pin.

3. In a resilient wheel of the character described, a felly channel-shaped in cross-section to form a bottom portion and a pair of interspaced flanged portions, a plurality of interspaced openings formed in the bottom portion of the channel, a plurality of bearing pins disposed between the side flanges of the channel, one adjacent each opening, and a cooperating bearing member formed in the bottom of the channel below each pin.

4. In a resilient wheel of the character described, a felly channel-shaped in cross-section to form a bottom portion and a pair of interspaced flanged portions, a plurality of interspaced openings formed in the bottom portion of the channel, a plurality of bearing pins disposed between the side flanges of the channel, one adjacent each opening, a plurality of reinforcing members bent up from the bottom portion of the channel and disposed between the side flanges to laterally reinforce the same, and a rounded bearing seat formed in the bottom of the channel below each pin.

5. A resilient wheel comprising a felly, channel-shaped in cross-section to form a bottom portion and a pair of interspaced side flanges, a plurality of interspaced openings formed in the bottom portion of the channel, a plurality of bearing pins disposed between the side flanges of the channel, one adjacent each opening, a hub member, a plurality of spring spokes disposed between the hub and the felly, the outer ends of said spokes passing through the interspaced openings formed in the bottom portion of the channel-shaped felly and terminating in eyes which surround the bearing pins, and a plurality of cooperating bearing members formed in the felly, one adjacent each bearing pin, said bearing members engaging the exterior surface of each spring spoke eye.

6. A resilient wheel comprising a felly channel-shaped in cross-section to form a bottom portion and a pair of interspaced side flanges, a plurality of interspaced openings formed in the bottom portion of the channel, a plurality of bearing pins disposed between the side flanges of the channel, one adjacent each opening, a hub member, a plurality of spring spokes disposed between the hub and the felly, the outer ends of said spokes passing through the interspaced openings formed in the bottom portion of the channel-shaped felly and terminating in eyes which surround the bearing pins, a plurality of cooperating bearing members formed in the felly, one adjacent each bearing pin, said bearing members engaging the exterior surface of each spring spoke eye, the inner ends of said spokes also terminating in eyes, bearing pins in the hub extending through said eyes, and a plurality of cooperating bearing members in the hub, one adjacent each bearing pin and engageable with the exterior portion of each eye.

DAVID D. BOHANNON.